United States Patent [19]

Moffett

[11] Patent Number: 4,704,780

[45] Date of Patent: Nov. 10, 1987

[54] APPARATUS FOR REPLACING A TRUNNION BRACKET SPINDLE

[75] Inventor: Darcel R. Moffett, Munster, Ind.

[73] Assignee: Judy's Walking Beam Service, Inc., Griffith, Ind.

[21] Appl. No.: 781,983

[22] Filed: Sep. 30, 1985

[51] Int. Cl.[4] .............................................. B23P 19/04
[52] U.S. Cl. ..................................................... 29/252
[58] Field of Search ......................... 29/251, 252, 227; 254/10.5, 29 R

[56] References Cited

U.S. PATENT DOCUMENTS

| | | | |
|---|---|---|---|
| 2,230,918 | 2/1941 | Walter . | |
| 2,253,411 | 8/1941 | Thompson . | |
| 2,485,022 | 10/1949 | Taylor . | |
| 3,174,218 | 3/1965 | McConaha . | |
| 3,183,585 | 5/1965 | West . | |
| 3,908,258 | 9/1975 | Barty | 29/252 |
| 4,120,082 | 10/1978 | Bond . | |
| 4,477,956 | 10/1984 | Mefford | 29/252 |
| 4,506,501 | 3/1985 | De Vall et al. | 29/252 |

OTHER PUBLICATIONS

Service Bulletin No. V556, Springs, Oct. 1, 1984, Mack Trucks, Inc.

*Primary Examiner*—Robert C. Watson
*Attorney, Agent, or Firm*—Willian Brinks Olds Hofer Gilson & Lione Ltd.

[57] ABSTRACT

An apparatus and method for replacing trunnion bracket spindles is disclosed. The preferred apparatus comprises a first plate and a second plate, threaded rods extending between the plates, and wing nuts on the ends of the rods to prevent the plates from spreading apart during use. The first plate includes a ram mounting pin to which a hydraulic ram is secured. The hydraulic ram is used to force the old spindle from the bracket bores and to force the new spindle through the bores. Also, the preferred apparatus includes scissor jacks to help position the second plate and ram with respect to the trunk suspension. The apparatus of the present invention is used by cutting out a center section of the trunnion spindle, forcing the remaining sections of the trunnion spindle from their respective bracket bores, and forcing a new trunnion spindle through the brackets bores.

8 Claims, 10 Drawing Figures

FIG. 1
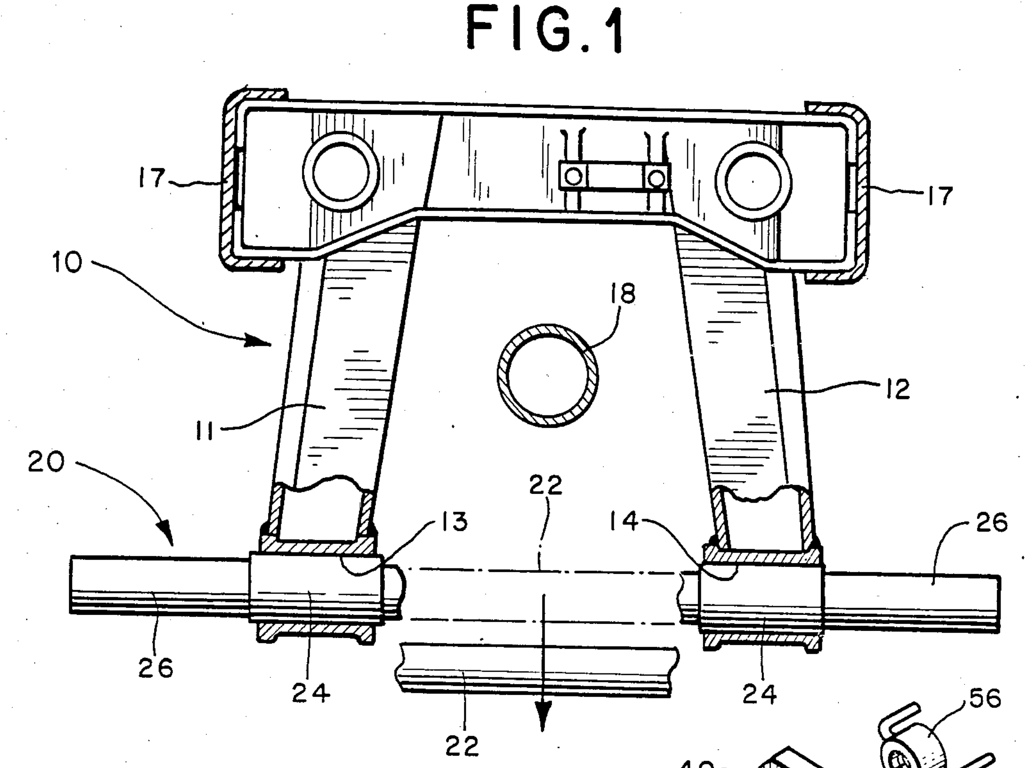
FIG. 2
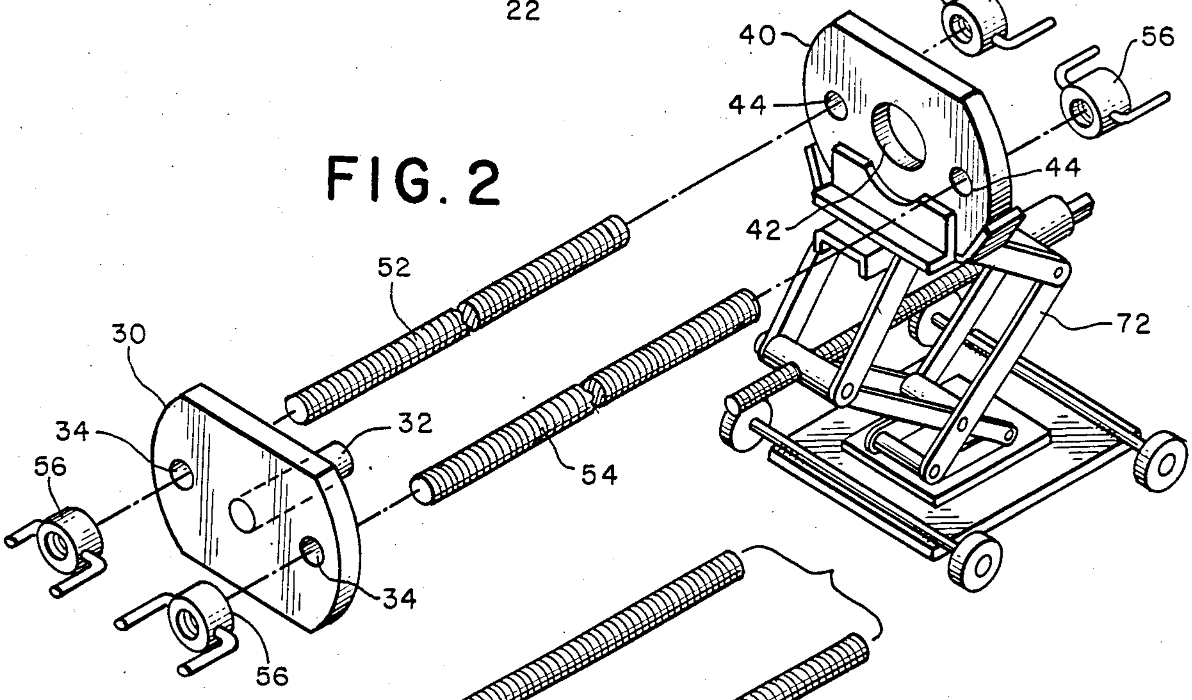
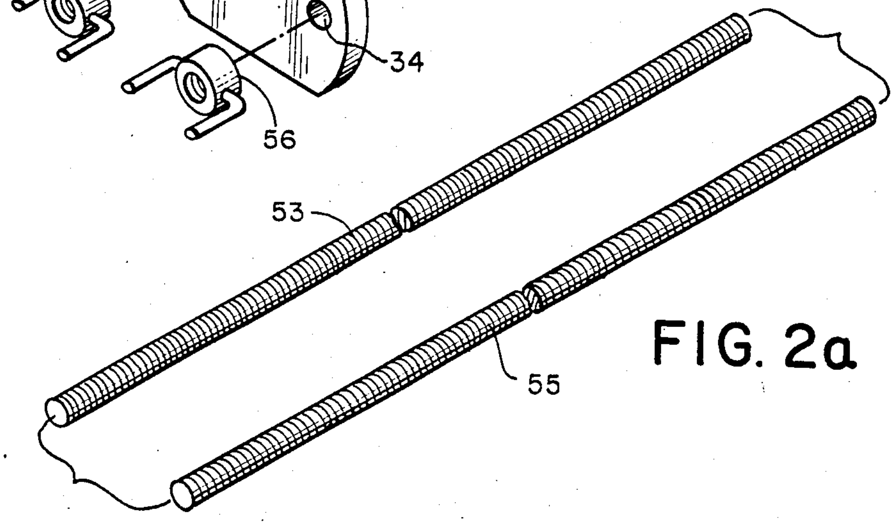
FIG. 2a

APPARATUS FOR REPLACING A TRUNNION BRACKET SPINDLE

BACKGROUND OF THE INVENTION

Tandem axle trucks, particularly those made by Mack Trucks, Inc., include a tandem bogie suspension which has a trunnion bracket and spindle, sometimes referred to as a trunnion tube. The trunnion bracket and spindle carry the weight of the frame to the springs which are mounted on the axle. The trunnion assembly is also used to help align the axles.

In the past when the spindle became worn and it became necessary to replace it, the truck had to be disassembled and the trunnion assembly removed from the truck itself. This is a very time consuming and expensive job, not only due to the labor used in the replacement but also because of the down time of the truck.

Some mechanics have attempted to get around the time involved in removing the suspension from the truck frame by cutting the bracket bores holding the trunnion spindle and removing the spindle from the bracket while the bracket remained mounted to the truck frame. Then a new spindle was inserted in the bracket bores, which were then clamped and welded closed. This method of replacing the trunnion spindle is not as time consuming as removing the whole assembly from the truck, but produces a repair which is inferior to the original suspension, primarily due to the fact that the bracket has been cut and rewelded.

SUMMARY OF THE INVENTION

Apparatus has been developed for replacing the trunnion spindle without removing the trunnion assembly from the truck frame. In a preferred embodiment the apparatus comprises a first plate having a perpendicularly attached ram mounting pin and two holes through the plate equally spaced apart from the mounting pin, the holes and the mounting pin all being in a line. A second plate having a spindle access hole larger in diameter than the spindle itself is also provided. The second plate includes two holes spaced the same distance from the center of the spindle access hole as the holes in the first plate are spaced from the mounting pin. Two sets of threaded rods are supplied with the apparatus. One short set is used with the two previously described plates in removing the spindle from the trunnion bracket bores, a longer set of rods are used when the apparatus is used to insert a new trunnion spindle into the bores. Wing nuts are used on each of the threaded rods to hold the plates in place around the trunnion bracket and spindle.

A pair of scissor jacks are provided to support the apparatus while the removal and insertion operation is conducted. During the insertion of the new trunnion spindle bracket a spacer is supplied between the two trunnion brackets. This spacer comprises two longitudinal pipe-half sections each having a plurality of connection tabs extending from the sections. The sections are held together by the connection tab to form a hollow cylinder. The length of the cylinder is equal to the distance between the trunnion brackets, the inside diameter of the cylinder is slightly larger than the diameter of the trunnion spindle.

In using the preferred apparatus of the present invention, the center section of the spindle is cut out and the remaining spindle sections are forced from the trunnion brackets bores. A new trunnion spindle is then forced through the bores. Because the trunnion spindle is interference-fit into its bracket bores, large forces are required to force the trunnion spindle from or into the bores. Therefore the present invention also includes an apparatus for mounting a hydraulic ram to provide the forces necessary to remove the trunnion spindle and force a new trunnion spindle into place.

By using the apparatus of the preferred embodiment of the invention, the removal and replacement of a trunnion spindle is accomplished quickly and inexpensively. In addition, the apparatus is structured so as to assure alignment of the new spindle as it is inserted in the trunnion bracket bores. The use of the scissor jacks make it very convenient to support the apparatus during this procedure. By having two sizes of threaded rods, the apparatus can be mounted on one trunnion bracket when removing a spindle section or, using the longer rods, on both brackets together when inserting the new spindle. This makes it possible, along with wing nuts used, to quickly position the apparatus and ram to force the spindle sections or new spindle through the bracket bores. These and other advantages, as well as the invention itself, will best be understood in reference to the drawings and detailed description of the preferred embodiment.

BRIEF DESCRIPTION OF THE DRAWINGS

FIG. 1 is an elevational view, partially in section, of the trunnion assembly of a Mack truck.

FIG. 2 is an exploded perspective view of the apparatus of the invention as assembled for the removal operation FIG. 2*a* is a perspective view of the long set of rods used with the apparatus of FIG. 2 during the insertion process.

DETAILED DESCRIPTION OF THE PREFERRED EMBODIMENT

Figure 3:
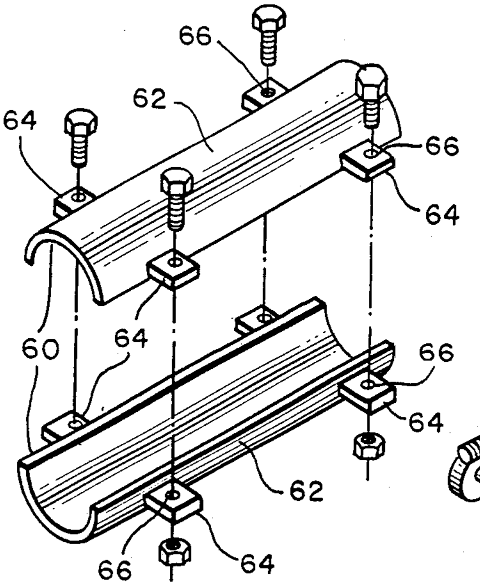
FIG. 3 is an exploded perspective view of the spacer used during the insertion operation.

As shown in FIG. 1, the trunnion assembly 10 of a Mack truck includes trunnion brackets 11 and 12 connected to the frame 17 of the truck, one bracket being on each side of the drive shaft 18. Through the ends of the brackets 11 and 12 are respectively, bores 13 and 14. The faces of the brackets 11 and 12 next to the bores 13 and 14 are machined, and are thus flat and perpendicular to the axis of the bores 13 and 14.

A trunnion spindle, also known as a trunnion tube, 20 extends through the trunnion bracket bores 13 and 14. In some original equipment, the diameter of the center section 22 of the trunnion spindle is larger than any other portions of the trunnion spindle 20, or at least as large as the diameter of the trunnion spindle sections 24 which are interference-fit within the trunnion bracket bores 13 and 14. The diameter of the outside sections 26 of the trunnion spindle 20 are generally smaller in diameter than the other portions. It is these outside sections 26 which are connected to other portions of the truck suspension, particularly brackets for mounting the springs. Currently, spindles 20 are available in which the diameter of the center section 22 is smaller than the diameter of the section 24 encompassed by the bores 13 and 14. If the spindle which is being inserted into the brackets to replace a spindle 20 does not have the center section 22 with a smaller diameter, material must be removed from the center section 22 to reduce its diameter in order to practice the method of the present invention.

FIG. 2 shows the presently preferred apparatus of the invention. The apparatus consist of a first plate 30 which may also be considered a ram mounting plate, a second plate 40 which may also be considered a spindle access plate, connecting rods 52 and 54, and wing nuts 56. In addition, when the new spindle is being inserted in the trunnion brackets, the apparatus includes the spacer 60 (shown in FIG. 3), and rods 53 and 55 (FIG. 2*a*) replace rods 52 and 54. A scissor jack 72 is used to support the second plate 40 during the set up of the apparatus.

The first plate 30 has attached to it a ram mounting pin 32. The mounting pin 32 is perpendicular to the surface of the plate 30. As shown in FIG. 2, the plate 30 also has two holes 34 equally spaced apart from and in a line with the mounting pin 32. These holes 34 are for insertion of the rods 52 and 54. The plate 30 is shaped so that it will fit within the workspace area available in a trunnion assembly.

As shown in FIG. 2, the second plate 40 has a large diameter hole 42 and two smaller diameter holes 44 which, like those of plate 30, are equally spaced apart from and are in a line with hole 42. The distance between the center of hole 42 and each of holes 44 is the same as the distance between the center of the mounting pin 32 and the holes 34 in plate 30. The diameter of hole 42 is larger than the diameter of the spindle 20. The outside shape of plate 40 is just like that of plate 30 so that it also fits against the machined surface of the trunnion bracket 11 or 12.

The apparatus of the present invention is assembled by inserting rods 52 and 54 through the holes 34 of the first plate 30 and holes 44 of the second plate 40. Wing nuts 56 are screwed onto the threads at both ends of the rods 52 and 54 as means for securing the plates 30 and 40 from sliding off the rods 52 and 54. The use of wing nuts 56 make it possible to quickly assemble, disassemble and adjust the apparatus.

Figure 4:
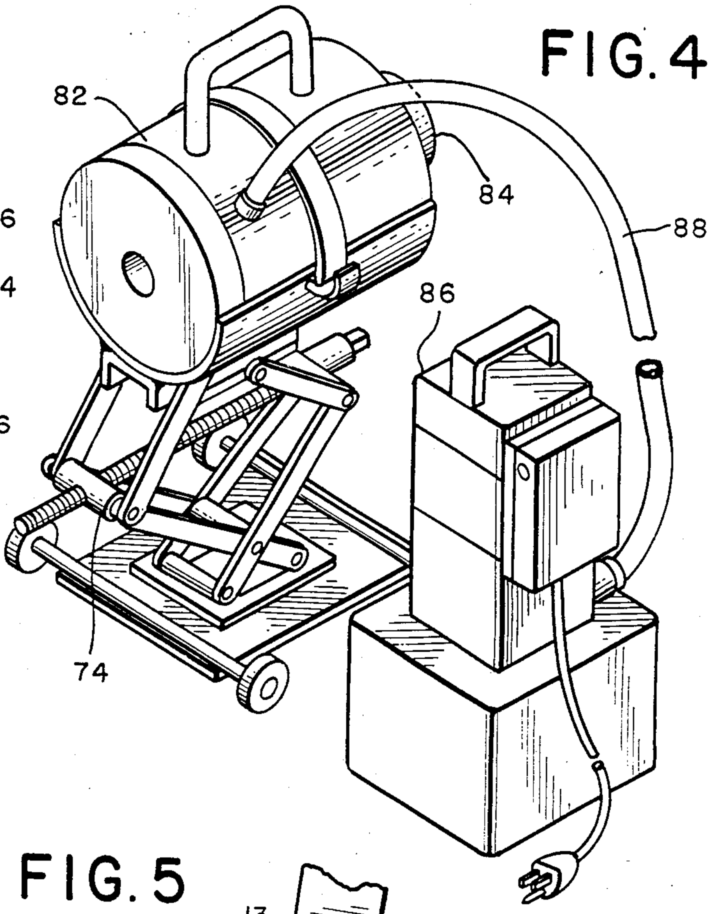
FIG. 4 is a perspective view showing the hydraulic ram mounted on a scissor jack and its associated pump, with the apparatus of FIG. 2.

As shown in FIG. 4, a hydraulic ram 82 is mounted on a scissor jack 74. An electrically operated pump 86 supplies hydraulic pressure through hose 88 to the ram 82. The scissor jacks 72 and 74 are designed to hold the apparatus of the present invention at the proper height during the set up of the apparatus and removal and insertion of the spindle 20. Scissor jack 72 is welded to plate 40 and scissor jack 74 cradles ram 82 which is used to provide the force necessary to remove or insert the spindle 20.

Figure 5:
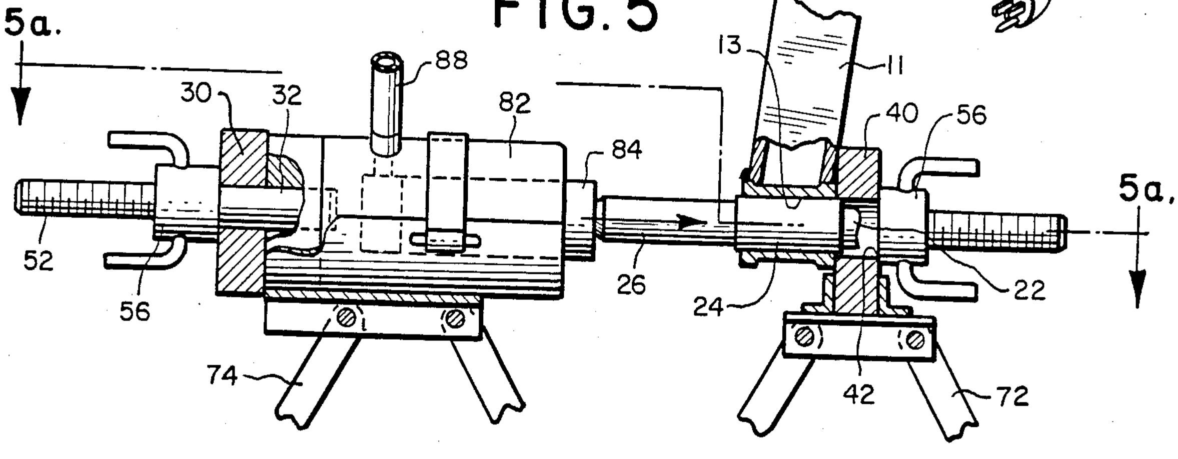
FIG. 5 is an elevational view of one bracket of the trunnion assembly of FIG. 1, the apparatus of FIG. 2 and the hydraulic ram of FIG. 4 during the removal operation.

To use the apparatus of the present invention, it is desirable to first measure the distance between the brackets 11 and 12, and between the outside of each bracket and the corresponding end of the spindle 20. These measurements are useful to verify alignment when the new spindle is installed. The inside section 22 of the spindle 20 is next cut out (FIG. 1). This is most commonly performed using an acetylene torch. Next the apparatus is positioned around one bracket which contains a remaining portion of the spindle 20 (FIG. 5). The ram 82 is positioned on the ram mounting pin 32 and the second plate 40 is positioned so that the protruding section of spindle 20 is free to travel through the hole 42. The rods 52 and 54 are then secured through the holes 34 and 44 and wing nuts 56 are threaded on the end of the rods 52 and 54. The wing nuts 56 are tightened down until the ram 82 comes to bear between the first plate 30 and against the end surface of the outside section 26 of the spindle 20.

After the proper alignment has been assured, pressure is applied to the hydraulic ram 82. It has been found necessary that a small amount of heat be applied to the bracket 11 during the removal process. However, the present invention makes it possible to use only such a slight amount of heat that the metallurgy and hardness of the steel making up bracket 11 are not affected. Typically this requires the application of an acetylene torch for a period of approximately 12 seconds.

Figure 5A:
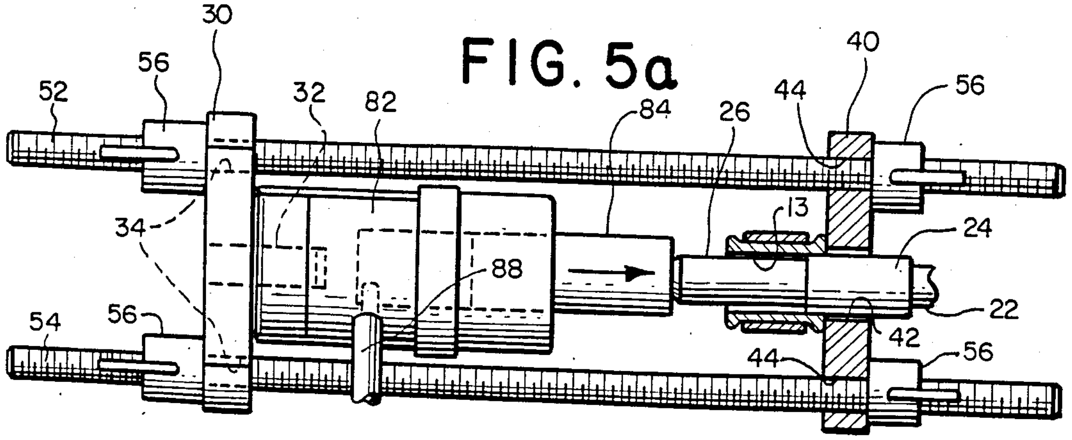
FIG. 5*a* is a sectional view taken along line 5*a*—5*a* of FIG. 5.

With pressure being applied through pressure hose 88 to the ram 82, the piston 84 of the ram 82 extends and the outside spindle section 26 is forced into the bore 13 of bracket 11, the protruding portion of the spindle 20 being free to pass through the hole 42 of the second plate 40 (FIG. 5*a*). As soon as the interference-fit section 24 of the spindle 20 has been pushed through the bore 13, the remaining piece of the spindle 20 can be pulled out of the bracket 11 by hand. This is because the diameter of section 26 of the spindle is smaller than that of the diameter of section 24. Wing nuts 56 are loosened and the entire apparatus is then placed around the other remaining portion of the spindle in trunnion bracket 12 and the removal process is repeated.

In order to insert a new spindle 20 through bracket bores 13 and 14, longer rods 53 and 55 must be used. Other than their length, the dimensions and threads of rods 53 and 55 are exactly like those of rods 52 and 54. Before a new spindle is inserted, a spacer 60 must be placed between the trunnion brackets 11 and 12. As shown in FIG. 3, the brace 60 is made from two half-sections 62. The sections are cut longitudinal to the axis of the pipe from which they are made. Extending from the sides of the half-sections 62 are connecting tabs 64. The tabs extend from the sides of the half sections 62 parallel to the plane of the longitudinal surface of the half-section 62. Holes 66 through the tabs 64 are used to bolt the two half-sections 62 together.

Before the spacer 60 is placed into position, the spindle section which was removed from bracket 12 is reinserted backwards into bracket 12. (See FIG. 6.) Thus, the small diameter in section 26 is now passing through bore 14 and protrudes inside the area where the spacer is to be mounted. This portion of the old spindle is thus used as a guide for the spacer during the insertion process. The new spindle 20 is inserted through bore 13 of bracket 11. Likewise, the outside section 26 of the new spindle 20 is longer than and has a smaller diameter than the bore 13. Therefore a portion of the new spindle 20 extends past the inside of bracket 11 through the bore 13. The spacer 60 is then positioned around these two protruding sections.

Figure 6:
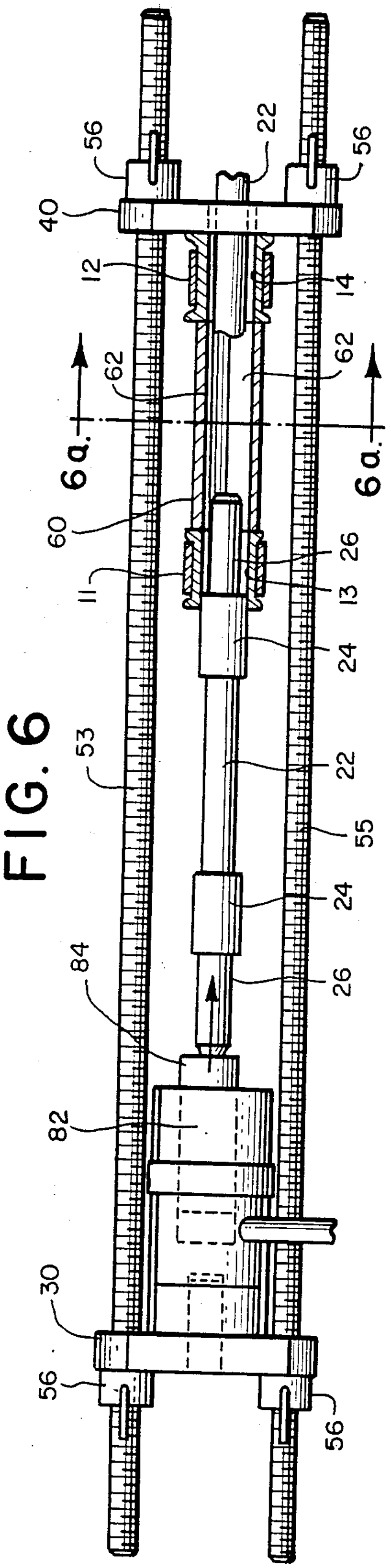
FIG. 6 is a plan view as in FIG. 5 during the insertion operation

Using the longer rods 53 and 55, the apparatus is again mounted so that the ram 82 can press against the end face of the new spindle 20 (FIG. 6). It is important that the spindle 20 be aligned with the bores 13 and 14 of brackets 11 and 12. This is insured in part by the presently preferred embodiment because of the fact that the mounting pin 32 and the holes 34 and 44 are perpendicular to the face of their respective plate members, which in turn contact the machined surfaces of brackets 11 and 12. Thus, when rods 53 and 55 are inserted through holes 34 and 44, the alignment provided by the machined surface of bracket 12 against plate 40 makes the rods 53 and 55 parallel to the axis of the bores 13 and 14. The use of the scissor jacks 72 and 74 to support the apparatus also helps to keep this alignment.

Figure 7:
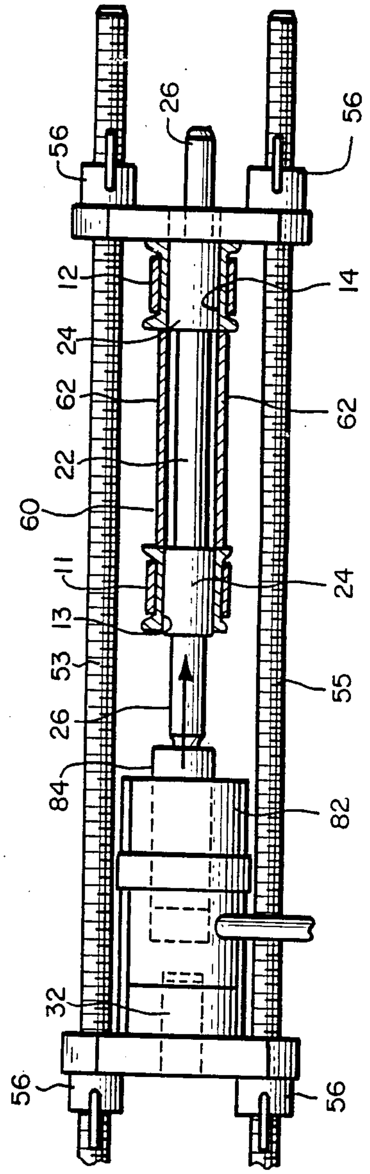
FIG. 7 is a plan view as in FIG. 6 showing the trunnion spindle in final position.

After the alignment has been checked, pressure is applied to the ram 82 which forces the spindle section 24 through the bracket bore 13. It has not been necessary to apply heat to the bracket during this portion of the procedure when a sufficiently forceful ram 82 is used. After the section 24 is completely through the bore 13, the center section 22 of the new spindle may be moved through the bore 13 by hand. This is because the diameter of the center section 22 is less than the inside diameter of the bore 13. In so moving the spindle 20, the outside section 26 of the spindle 20 knocks the old spindle section out of bore 14 and takes its place. A portion of the spindle section 26 will protrude through bore 14 and hole 42 of the second plate 40. Rods 53 and 55 and wing nuts 60 are again positioned so that the ram 82 abuts the end face of the new spindle 20. Again pressure is applied to the ram 82 and the interference-fit sections 24 of the new spindle are both forced through their respective bores 13 and 14 (FIG. 7). When the outside sections 26 of spindle 20 extending past the outside of bores 13 and 14 are equal, pressure is relieved from the ram 82 and the apparatus is disassembled, the replacement operation being complete.

It has been found that the distance travelled by the pistons of most rams is less than the length of the bores 13 and 14. Thus most of the forcing operations described above must be accomplished in two or more strokes of the piston 84 of ram 82, with the ram 82 being repositioned between each stroke. This illustrates the benefits of having wing nuts 56 on the ends of rods 52 and 54, or 53 and 55. After the application of pressure and the full extension of the piston 84 of ram 82, the wing nuts 56 can be further tightened down and the piston of ram 82 compressed, ready for the next application of pressure.

Figure 6A:
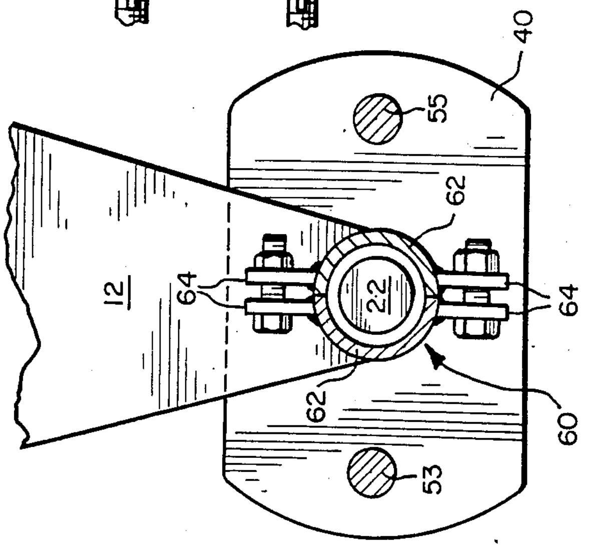
FIG. 6*a* is a cross sectional view taken along line 6*a*—6*a* of FIG. 6.

After the new spindle 20 is in place, bolts holding the half-sections 62 of the spacer 60 may be removed (FIG. 6*a*). The spacer 60 thus comes apart so that it can be removed. The spacer 60 functions to maintain the proper distance between bracket 11 and 12, which are under pressure from the new spindle rushing against the outside surface of bracket 11 and from the plate 40 rushing against the outside surface of bracket 12.

In the preferred embodiment of the invention the holes 34 are spaced about 4.7 inches from the center of the mounting pin 32, the total length of the plate 30 being approximately 15 inches and the width being approximately 10 inches. The mounting pin 32 extends approximately 6 inches from the face of the plate 30. It has been found that plate 30 and plate 40 must be sufficiently strong, ASTM A36 steel approximately 1½ inches thick being preferred. The diameter of mounting pin 32 is chosen to fit the particular ram 82 used. In the preferred embodiment, the ram 82 used is Model 51678, an 80 ton ram available from Owatonn Tool Company, Owatonn, Minn. 55060.

The rods 52 and 54 are approximately 55 inches long. The rods 53 and 55 are approximately 90 inches long. Both sets of rods are 1¾ inch in diameter and preferably made from material having 125000 psi minimum tensile strength. Of course one set of long rods could be used, but then the wing nuts 56 would have to be turned quite a distance when using the apparatus. Wing nuts 56 have an inside diameter of 1¾ inches, with ½ inch diameter bars extending about 1.6 inches from the face of the nut before bending approximately 45° and extending approximately another three inches.

The spacer 60 half-sections 62 must be the appropriate length to fit between the model of trunnion brackets on the truck being serviced. It has been found that one of two spacers, one 16.13 inches long and one 17.38 inches long, will provide the proper spacing for most trucks. In some instances shimming may be required. The spacer half sections 62 are made from material having a 4¼ inch outside diameter and 3½ inside diameter. Four connecting tabs 64 are included on each half-section 62, spaced approximately 2½ inches from the end of the half-section 62. The tabs themselves are approximately 1½ inches long and 1¼ wide having a ½ inch diameter hole through their center.

It should be understood that the preferred embodiment described in detail herein is illustrative of various aspects of the invention and various changes and modifications to the presently preferred embodiment will be apparent to those skilled in the art. Therefore the following claims, including all equivalents, define the scope of this invention.

I claim:

1. Apparatus for replacing a trunnion spindle mounted in trunnion brackets of a tandem bogie truck suspension comprising:

(a) a first plate having a perpendicularly attached ram mounting pin, and a plurality of holes through the plate spaced from the alignment pin;

(b) a second plate having a spindle access hole larger in diameter than the spindle and a plurality of other holes spaced from the spindle access hole;

(c) a plurality of rods with a first end extending through the holes of the first plate and with a second end extending through the plurality of other holes of the second plate;

(d) means for securing the plates from sliding off the rods and (e) a trunnion bracket spacer sized to fit between the brackets.

2. The apparatus of claim 1 wherein the spacer comprises two longitudinal pipe half sections each having one or more connection tabs extending from the half sections parallel to the longitudinal plane of the pipe half section wherein the two halves are designed to be secured together by said connecting tabs to form a hollow cylinder, the inside diameter of which is greater than the spindle diameter.

3. The apparatus of claim 1 wherein the plurality of holes in the first plate comprises two holes and the plurality of other holes of the second plate comprises two holes, and wherein each of the holes of the first plate are equally spaced from and are in a line with the center of the ram mounting pin and wherein each of the other holes of the second plate are equally spaced from and are in a line with the center of the spindle access hole, and wherein the equal distance of the holes in the first plate is the same as the equal distance of the holes in the second plate.

4. The apparatus of claim 1 wherein the plurality of rods are threaded on each end and wherein the securing means comprise wing nuts configured to be threaded on the rods.

5. The apparatus of claim 1 wherein the plurality of rods comprises two sets of rods, one short set being used with the plates during the removal of spindle sections and one long set being used with the plates during the insertion of a new spindle.

6. The apparatus of claim 1 further including a hydraulically operated ram.

7. The apparatus of claim 6 further including a pair of scissor jacks to hold the second plate and the ram in position while securing the apparatus to a truck suspension.

8. The apparatus of claim 1 wherein the first and second plate are steel, approximately $1\frac{1}{2}$ inches thick.

* * * * *

UNITED STATES PATENT AND TRADEMARK OFFICE
CERTIFICATE OF CORRECTION

PATENT NO. : 4,704,780

DATED : Nov. 10, 1987

INVENTOR(S) : Darcel R. Moffett

It is certified that error appears in the above-identified patent and that said Letters Patent is hereby corrected as shown below:

IN THE ABSTRACT

In the next to the last line of the Abstract (line 16) please delete the word "brackets" and substitute therefor --bracket--.

IN THE SUMMARY OF THE INVENTION

In column 1, line 63, after the word "brackets," please insert --and--;

In column 2, line 1, please delete the word "brackets" and substitute therefor --bracket--.

IN THE BRIEF DESCRIPTION OF THE DRAWINGS

In column 2, line 33, please end the sentence with a period (.);

In column 2, line 41, after the word "pump," please insert --used--;

In column 2, line 50, please end the sentence with a period (.).

UNITED STATES PATENT AND TRADEMARK OFFICE

CERTIFICATE OF CORRECTION

PATENT NO. : 4,704,780

DATED : Nov. 10, 1987

INVENTOR(S) : Darcel R. Moffett

It is certified that error appears in the above-identified patent and that said Letters Patent is hereby corrected as shown below:

IN THE DETAILED DESCRIPTION OF THE PREFERRED EMBODIMENT

In column 2, line 62, please insert a comma (,) after "are" and before "respectively";

In column 3, line 20, please delete "consist" and substitute therefor --consists--;

In column 5, line 55, please delete "bracket" and substitute therefor --brackets--;

In column 5, lines 56 and 58, in both occurrences, please delete the word "rushing" and substitute therefor "pushing";

In column 6, line 26, after "1-1/4", please insert the word --inches--;

In column 6, line 50, please insert a semi-colon (;) after "rods" and before "and".

Signed and Sealed this

Fifteenth Day of November, 1988

*Attest:*

DONALD J. QUIGG

*Attesting Officer*

*Commissioner of Patents and Trademarks*